(12) United States Patent
Eck

(10) Patent No.: US 6,235,843 B1
(45) Date of Patent: May 22, 2001

(54) METHOD FOR PRODUCING CROSS-LINKABLE REDISPERSIBLE POWDERS CONTAINING ISOCYANATE GROUPS

(75) Inventor: Herbert Eck, Bad Toelz (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/381,085

(22) PCT Filed: Mar. 19, 1998

(86) PCT No.: PCT/EP98/01598

§ 371 Date: Sep. 14, 1999

§ 102(e) Date: Sep. 14, 1999

(87) PCT Pub. No.: WO98/42756

PCT Pub. Date: Oct. 1, 1998

(30) Foreign Application Priority Data

Mar. 20, 1997 (DE) .............................. 197 11 741

(51) Int. Cl.$^7$ ...................................... C08F 8/30
(52) U.S. Cl. ..................... 525/123; 525/57; 525/125; 526/312; 528/69; 428/425.1
(58) Field of Search ............... 526/312; 525/57, 525/123, 125; 528/69; 428/425.1

(56) References Cited

U.S. PATENT DOCUMENTS

| | | | |
|---|---|---|---|
| 4,743,698 | * 5/1988 | Ruffner et al. | 549/478 |
| 5,314,964 | 5/1994 | Lucas . | |
| 5,536,776 | * 7/1996 | Carpenter et al. | 524/556 |
| 6,090,892 | * 7/2000 | Ishida et al. | 525/212 |

FOREIGN PATENT DOCUMENTS

| | | |
|---|---|---|
| 43 02 084 C1 | 2/1994 | (DE) . |
| 44 33 874 C2 | 3/1998 | (DE) . |

OTHER PUBLICATIONS

Derwent Abstract corresponding to DE–A 44 33 874 AN 96–172260[18].

Derwent Abstract corresponding to DE–B 43 020 84 AN 94–04397[06].

Houben–Weyl, Methods of Organic Chemistry, vol. XIV, 1, Micromolecular Substances, Georg Thieme Verlag, 1961, 192–208.

* cited by examiner

Primary Examiner—James J. Seidleck
Assistant Examiner—Melanie D. Bagwell
(74) Attorney, Agent, or Firm—Brooks & Kushman P.C.

(57) ABSTRACT

The invention relates to a process for preparing crosslinkable redispersible powders containing isocyanate groups by aqueous, emulsion copolymerization of ethylenically unsaturated monomers, at least one of which is isocyonate-functional, followed by drying, preferably spray drying, in the presence of a protective colloid.

20 Claims, No Drawings

US 6,235,843 B1

METHOD FOR PRODUCING CROSS-LINKABLE REDISPERSIBLE POWDERS CONTAINING ISOCYANATE GROUPS

The invention relates to a process for the preparation of crosslinkable dispersion powders which are redispersible in water and contain isocyanate groups.

The preparation of aqueous dispersions which contained masked isocyanate groups was already a research subject which was paid much attention in the 1960s. Aqueous dispersions of copolymers which contain masked isocyanates are employed, above all, for the preparation of crosslinkable coating compositions, to which low or high molecular weight crosslinking agents with hydroxyl, carboxyl or amine groups, which react with the masked isocyanate function, are added for crosslinking.

An isopropenyl-dimethylbenzyl isocyanate (TMI) was mentioned for the first time in 1966. This molecule, which in general is present as a meta or para derivative, can be copolymerized, on the basis of its polymerization parameters, by free radicals by the customary methods, for example with vinylaromatics, (meth)acrylic acid compounds, dienes and maleic and fumaric acid derivatives, but not, for example, with ethylene, vinyl esters and vinyl chloride. For preparation of copolymers of isopropenyl-dimethylbenzyl isocyanate (TMI) with monomers with unfavourable copolymerization parameters, U.S. Pat. No. 5,314,964 proposes grafting of TMI onto polymers of these monomers.

Other isocyanates which are suitable for the preparation of aqueous polymer dispersions are described by the general formula (I) $CH_2=CR^1—CO—O—R^2—CR^3R^4—N=C=O$ where $R^1$=H or $CH_3$ and $R^2$=an alkylene group having 1 to 18 C atoms, and $R^3$ and $R^4$=identical or different alkyl groups having 1 to 4 C atoms. Their preparation is described in DE-B 4302084. These (meth)-acrylic acid derivatives containing isocyanate groups can also be copolymerized with vinyl esters, vinyl chloride and ethylene. Their polymerization in an aqueous emulsion in the presence of an anionic and/or nonionic emulsifier by the preemulsion process is described in DE-A 4433874. With the aid of core/shell polymerization—the isocyanate in the core and the functional groups intended for the crosslinking, for example hydroxyl, in the shell—it was possible to dispense with additional bi- or polyfunctional crosslinker molecules. It was also proposed to block the isocyanate groups, for example with carbamates, presumably because the storage stability of the polymers was still not adequate. The copolymers can be obtained as solid substances from the aqueous polymer dispersions obtainable by this process by drying processes, such as spray or freeze drying. However, the products obtained by this procedure are not redispersible in water.

The object of the invention was thus to provide crosslinkable polymers which contain isocyanate groups, have an adequate storage stability, and above all are readily redispersible in water.

Surprisingly, it has been possible to achieve the object by carrying out the preparation of the copolymers containing isocyanate groups and the drying thereof in the presence of protective colloids. It is surprising that the isocyanate groups do not react immediately with crosslinking, although the polymerization and drying are carried out in the presence of polyvinyl alcohol or other protective colloids which contain hydroxyl groups or other reactive H atoms, and at elevated temperature.

The invention relates to a process for the preparation of crosslinkable dispersion powders which are redispersible in water and contain isocyanate groups by free-radical emulsion polymerization of one or more ethylenically unsaturated monomers in the presence of 0.2 to 6% by weight, based on the total weight of the monomers, of one or more compounds from the group consisting of meta- and para-isopropenyl -alpha,alpha-dimethylbenzyl isocyanate and isocyanates of the general formula (I) $CH_2=CR^1—CO—O—R^2—CR^3R^4—N=C=O$ where $R^1$=H or $CH_3$ and $R^2$=an alkylene group having 1 to 18 C atoms, and $R^3$ and $R^4$=identical or different alkyl groups having 1 to 4 C atoms, and drying of the dispersions obtained by this polymerization, characterized in that the emulsion polymerization and the drying are carried out in the presence of 5 to 70% by weight of a protective colloid, based on the total weight of the monomers.

Preferred isocyanates are meta- and para-iso -propenyl-alpha,alpha-dimethylbenzyl isocyanate (TMI) and 2-methyl-2-isocyanatopropyl methacrylate. The isocyanates are preferably copolymerized in an amount of 0.5 to 5% by weight, based on the total weight of the monomers. If appropriate, the isocyanate groups of the compounds mentioned can also be blocked, for example with phenol, salicylic acid esters, ketoximes, caprolactam, malonic acid dialkyl esters, acetoacetic acid alkyl esters, 2,2-dimethyl-1, 3-dioxane-4,6-dione, hydroxamic acid esters and amineimides.

Suitable comonomers are one or more monomers from the group consisting of vinyl esters of unbranched or branched alkylcarboxylic acids having 1 to 18 C atoms, methacrylic acid esters and acrylic acid esters of unbranched or branched alcohols having 1 to 18 C atoms, olefins, vinylaromatics and vinylhalogen compounds.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having up to 11 C atoms, for example VeoVa9$^R$, VeoVa10$^R$ or VeoVa11$^R$. Vinyl acetate is particularly preferred. Preferred acrylic acid esters or methacrylic acid esters are their methyl, ethyl, n-propyl, iso-propyl, n-butyl, iso-butyl, t-butyl, hexyl, ethylhexyl, cyclohexyl and dodecyl esters. Preferred olefins are ethylene, propylene, butadiene or isoprene. Preferred vinylaromatics are styrene, methylstyrene and vinyltoluene. Vinyl chloride is the preferred vinyl halide.

For the copolymerization of TMI, the copolymerization parameters are to be taken into account in the choice of comonomers. TMI is a methylstyrene derivative and therefore cannot be copolymerized with vinyl esters, ethylene, propylene and vinyl halides in the customary manner. If copolymers are nevertheless to be prepared with such monomers, the known measures for the preparation of graft polymers or of core/shell polymers must be used, for example those described in U.S. Pat. No. 5,314,964 and DE-B 4433874.

If appropriate, monomers which contain one or more reactive H atoms can also be copolymerized. Monomers with reactive H atoms are, for example, hydroxyalkyl (meth) acrylates, such as hydroxypropyl (meth)-acrylate, hydroxybutyl (meth)acrylate and hydroxyethyl (meth) acrylate; ethylenically unsaturated carboxylic acids, such as (meth) acrylic acid, fumaric acid, maleic acid and itaconic acid, amides thereof, the half-esters of fumaric and/or maleic acid, the hydroxyalkyl esters of the carboxylic acids mentioned, and their monoesters with polyalkylene glycols having 2 to 10 recurring alkylene oxide units. The equivalent ratio of active H atoms to NCO groups can be 0.2 to 3, preferably 0.6 to 1.4. If a particularly good storage stability is required, the comonomers containing active H atoms can be copolymerized in a core/shell polymerization, TMI and/or the compounds of the general formula (I), if appropriate in blocked form, being copolymerized into the core and the monomers containing a reactive H atom being copolymerized into the shell, or vice versa. The weight ratio of core to shell can be 20:80 to 70:30; ratios of 40:60 to 60:40 are advantageous.

Possible comonomers are also compounds from the group consisting of ethylenically unsaturated sulphonic acids and salts thereof, preferably vinylsulphonic acid; and/or silanes which can be polymerized by free radicals or silanes containing mercaptan or Si—H groups. Preferred silicon-containing monomers are vinyltri-methoxy- and vinyltriethoxysilane, gamma-methacryloxypropyltriethoxysilane and vinylmethyldi-methoxy-, -diethoxy-, -dibutoxy- and -di-l-methyl-2-methoxy-silane and (partial) hydrolysates thereof. Other comonomers having a crosslinking action, such as, for example, acrylamidoglycolic acid (AGA), methacrylamidoglycolic acid methyl ester (MAGME), N-methylolacrylamide (NMAA), N-methylolmethacrylamide, allyl N-methylolcarbamate and alkyl ethers, such as the isobutoxy ether, or esters of N-methylolacrylamide, of N-methylolmethacrylamide or of allyl N-methylol-carbamate, are also suitable comonomers. Monomers containing epoxide groups, such as glycidyl (meth)acrylate, are also suitable.

The emulsion polymerization is carried out in an open reaction vessel or in pressure vessels in a temperature range from 0 to 100° C., preferably from 10 to 60° C. The initiation is carried out by means of the customary agents which form free radicals and are at least partly water-soluble, these preferably being employed in amounts of 0.01 to 3.0 by weight, based on the total weight of the monomers. Examples of these are ammonium, sodium and potassium sulphate, hydrogen peroxide and alkyl hydroperoxides, such as tert-butyl hydroperoxide; and azo compounds, such as azobisisobutyronitrile or azobiscyanovaleric acid. If appropriate, the free-radical initiators mentioned can also be combined in a known manner with 0.01 to 1.0% by weight, based on the total weight of the monomers, of reducing agents. Alkali metal formaldehydesulphoxylates and ascorbic acid, for example, are suitable. In the case of redox initiation, one or both redox catalyst components are preferably metered in during the polymerization.

The pH range desired for the polymerization, which is in general between 2.5 and 9, preferably 3 and 8, particularly preferably 4 and 7, can be established in a known manner by acids, bases or customary buffer salts, such as alkali metal phosphates or alkali metal carbonates. To establish the molecular weight, the regulators usually used, for example mercaptans, aldehydes and chlorohydrocarbons, can be added during the polymerization.

Dispersing agents which can be employed are all those customarily used for emulsion polymerization. Suitable protective colloids are familiar to the expert, for example vinyl alcohol/vinyl acetate copolymers having a content of 80 to 100 mol % of vinyl alcohol units; polyvinylpyrrolidones having a molecular weight of 5000 to 400,000; polysaccharides in water-soluble form, such as hydroxyethylcelluloses with a range of the degree of substitution from 1.5 to 3, starches (amylose and amylopectin), cellulose, guar, tragacanthic acid, dextran, alginates and carboxymethyl, methyl, hydroxyethyl and hydroxypropyl derivatives thereof; animal and vegetable proteins, such as casein, soya protein and gelatin; synthetic polymers, such as poly(meth)acrylic acid, poly-(meth)acrylamide, polyvinylsulphonic acids and water-soluble copolymers thereof; and melamineformaldehyde-sulphonates, naphthaleneformaldehydesulphonates, styrene/maleic acid and vinyl ether/maleic acid copolymers and ligninsulphonates.

Preferred protective colloids are water-soluble vinyl alcohol/vinyl acetate copolymers having a content of 80 to 100 mol % of vinyl alcohol units, starch or starch derivatives and cellulose derivatives. The protective colloids are preferably employed in amounts of 5 to 50% by weight, particularly preferably 5 to 35% by weight, in each case based on the total weight of the monomers. In a particularly preferred embodiment, the polymerization is carried out with a protective colloid without addition of an emulsifier.

If emulsifiers are also to be employed, in addition to the protective colloid, both anionic and nonionic emulsifiers are suitable. Preferred emulsifiers are those which are not soluble in the protective colloid and have molecular weights, in contrast to the protective colloid, below 2000. The emulsifiers are employed in an amount of 0 to 6% by weight, based on the total weight of the monomers. Suitable emulsifiers are familiar to the expert and are found, for example, in Houben-Weyl, Methoden der organischen Chemie [Methods of Organic Chemistry], volume XIV, 1, Makromolekulare Stoffe [Macromolecular substances], Georg Thieme Verlag, Stuttgart, 1961, 192–208.

The polymerization can be carried out discontinuously or continuously, with or without the use of seed latices, all the constituents or individual constituents of the reaction mixture being initially introduced into the reaction vessel, or the constituents or individual constituents of the reaction mixture being initially introduced in part and subsequently metered in, or by the metering process without initial introduction into the reaction vessel. The solids content of the dispersions obtainable in this way is in general 20 to 65%.

Drying can be carried out by the customary processes, for example by means of freeze drying or by drying under reduced pressure or fluidized bed drying. Spray drying is particularly preferred. It is carried out in the customary spray drying units, it being possible for the atomization to take place by means of one-, two- or multicomponent nozzles or with a rotating disc. The exit temperature is in general chosen in the range from 55° C. to 100° C., preferably 70° C. to 90° C., depending on the unit, the glass transition temperature of the resin and the desired degree of drying.

In the case of spray drying, if appropriate, a mixture of the dispersion prepared according to the invention, having a solids content of preferably 20 to 60%, and of further additives, can be jointly sprayed and dried.

In this procedure, if appropriate, the crosslinking agent can be admixed to the powder in the form of water-soluble or water-dispersible solid particles, or the crosslinking agent is admixed or co-atomized to the drying mixture. Suitable crosslinking agents are compounds which contain at least 2 reactive H atoms which can react with the isocyanate groups. Examples of these are polyols, polyamines (for example hexamethylenediamine or aminofunctional siloxanes) or polycarboxylic acids.

In a preferred embodiment, the dispersion powder composition comprises 5 to 70% by weight, preferably 10 to 35% by weight of protective colloid, based on the polymer, it being possible for at least some of the amount of protective colloid to be added to the finished dispersion before the spray drying, preferably in the form of an aqueous solution. Further constituents of the dispersion powder composition are, if appropriate, emulsifiers which are not soluble in the protective colloids employed, hydrophobizing agents, defoamers and antiblocking agents, such as Ca carbonate or Mg carbonate, talc, gypsum, silicic acid and silicates having particle sizes preferably in the range from 10 nm to 10 μm.

The dispersion powder composition can be employed in the typical fields of use, for example in chemical products for construction in combination with inorganic, hydraulically setting binders, such as cements (Portland, aluminate, trass, sheathing, magnesia and phosphate cement), gypsum and water-glass, for the preparation of building adhesives, plasters, filler compositions, flooring filler compositions, joint mortars and paints, and furthermore as sole binders for coating compositions and adhesives or as binders and coating compositions for textiles and paper.

The dispersion powder composition is preferably employed as a water- and solvent-resistant binder or coating composition in fields of use where, in addition to good adhesion, a reduced uptake of water and/or a resistance to solvents is also desired.

The dispersion powders which are prepared by the process according to the invention and are redispersible in water have the advantage of a longer storage life compared with the corresponding dispersions, the advantage of the easy possibility of admixing of crosslinking agents and catalyts, without premature crosslinking being feared, and the other customary advantages of powders over dispersions (transportation, packaging, possibility of the preparation of finished dry mixtures).

The finding that a simultaneous copolymerization of hydroxyethyl acrylate and TMI leads to storage-stable products was particularly surprising. On the basis of experiences to date, this was not foreseeable. In core/shell polymerization, the isocyanate groups (in the core) were separated here from the reactive H atoms (in the shell) and protected from the aqueous medium. The resulting disadvantage: the urethane or urea groups formed in the reaction often have good adhesion-promoting properties which, if these are in the core, can have only little effect, if any.

EXAMPLES

Comparison Example 1

58 g of polyvinyl alcohol (G04/140, product of Wacker-Chemie), dissolved in 770 g of Wofatit water, were initially introduced into a 1.5 l stirred vessel and the solution was heated to 80° C. After 50 ml of a mixture of 263 g each of butyl acrylate and styrene had been stirred in, metering of the catalyst was started. An 8% strength aqueous Bruggolit solution and a 4.9% strength aqueous solution of t-butyl hydroxide were used as the redox catalyst system. The metering time for the monomers was 2 hours. The meterings of the catalyst were stopped after a further hour and the dispersion was cooled. The dispersion had a residual monomer content of 0.3%, a solids content of 44%, a viscosity (Brookfield, 20 rpm) of 14,800 mPas and a pH of 5.6.

Example 1

The process was analogous to Comparison Example 1, but 15.8 g of the 526 g of butyl acrylate/styrene mixture (1:1) were replaced by meta-isopropenyl-alpha,alpha-dimethylbenzyl isocyanate (=TMI). The dispersion had a residual monomer content of 0.5%, a solids content of 44.6%, a viscosity (Brookfield, 20 rpm) of 9300 mPas and a pH of 5.8.

Comparison Example 2

A solution of 77.5 g of polyvinyl alcohol (G 04/140), dissolved in 706 g of Wofatit water, was initially introduced into a 2.5 l stirred vessel and 120.6 g of a 1:1 mixture of styrene and butyl acrylate were preemulsified therein. After the emulsion had been heated to 50° C., the meterings of a 4.9% strength aqueous t-butyl hydroperoxide solution, an 8.3% strength aqueous ascorbic acid solution and a 1:1 mixture of styrene and butyl acrylate were started simultaneously. After 2 hours, the metering of the monomer had ended. After-polymerization was carried out with a 10% strength $H_2O_2$ solution. The dispersion had a residual monomer content of 0.3%, a solids content of 50.4%, a viscosity (Brookfield, 20 rpm) of 22,000 mPas and a pH of 5.0.

Example 2

The process was analogous to Comparison Example 2, but 23.5 g of the 1:1 mixture of styrene and butyl acrylate metered in were replaced by TMI. The dispersion had a residual monomer content of 0%, a solids content of 49.4%, a viscosity (Brookfield, 20 rpm) of 11,750 mPas and a pH of 4.0.

Example 3

In this example, a crosslinkable shell was polymerized onto a non-crosslinkable core, which made up 65% of the polymer composition. The process was analogous to Comparison Example 1, except that 15.8 g of TMI were metered in with the last third of the monomer mixture. The dispersion had a residual monomer content of 0.5%, a solids content of 43.3%, a viscosity (Brookfield, 20 rpm) of 13,750 mPas and a pH of 5.8.

Example 4

The process was analogous to Example 2, except that instead of the total amount of 77.5 g of polyvinyl alcohol, 232.5 g of Gelbdextrine Avedex 35 (product of Avebe) were initially introduced, and at the same time the amount of water initially introduced was increased by 150 g. The dispersion had a residual monomer content of 0.25%, a solids content of 50.7%, a viscosity (Brookfield, 20 rpm) of 214 mPas and a pH of 4.7.

Example 5

The process was analogous to Example 2. 27.4 g of the amount of styrene and butyl acrylate metered in were replaced by hydroxyethyl acrylate. The dispersion had a residual monomer content of 0.2%, a solids content of 50.7%, a viscosity (Brookfield, 20 rpm) of 8000 mPas and a pH of 5.7.

Example 6

100 g of a mixture of 70 g of vinyl acetate and 30 g of butyl acrylate were emulsified into a solution of 77 g of polyvinyl alcohol (G 04/140) in 706 g of Wofatit water in a 2.5 l stirred vessel. After the emulsion had been heated to 50° C., 704.1 g of a solution of 16.1 g of 2-methyl-2-isocyanatopropyl methacrylate, 492.8 g of vinyl acetate and 211.2 g of butyl acrylate were metered in simultaneously with a 4.9% strength aqueous butyl hydroperoxide solution and an 8% strength aqueous Bruggolit solution in the course of 1¾ hours. The dispersion had a residual monomer content of 0.1%, a solids content of 50.1%, a viscosity (Brookfield, 20 rpm) of 2400 mPas and a pH of 5.3.

Drying of the Dispersions:

In all the examples and comparison examples, the atomization was carried out in a Nubilosa spray dryer. The exit temperature was 80° C. and the compressed air pressure before the two-component nozzle was 4 bar. The solids content of the dispersions was adjusted to about 30%, with the exception of Example 4 at 50.7%.

Before the atomization, 6% by weight, based on the polymer content, of polyvinyl alcohol (G 04/140) in the form of a 20% strength aqueous solution was added to all the dispersions, except to that from Example 4.

Determination of the Crosslinking:

A film about 700 μm thick was produced from the starting dispersion or the powder redispersed in water, if appropriate with the additives listed in the table (drying time: 3 days at room temperature).

0.5 g of the film in 30 g of dimethylformamide was heated in a microwave oven at 170° C. for 5 minutes. After the mixture had been cooled, it was centrifuged at 20,000 rpm for 1 hour. The evaluation is carried out by determination of the solids content in the supernatant liquid. The degree of crosslinking was calculated with the formula: $(SC_m/SC_t-1) \times 100$, where: $SC_m$=solids content measured, $SC_t$=theoretical solids content.

In the experiments on isocyanate crosslinking with hexamethylenediamine (HMDA) and aminofunctional siloxane (AMS 40), the crosslinking agent and 10% strength milk of lime were stirred into the dispersion or the redispersion of the powders and the films used for measurement of the crosslinking were produced therefrom analogously. The crosslinking was determined analogously to the abovementioned method. The measurement results are summarized in the table.

TABLE

| | Degree of crosslinking (%) | | |
|---|---|---|---|
| Example | without cross-linking agent | with HMDA | with AMS 40 |
| Comparison Example 1 | | | |
| Dispersion | 7.3 | — | — |
| RD powder | 2.0 | 21.4 | — |
| Example 1 | | | |
| Dispersion | 29.4 | — | — |
| RD powder | 31.3 | 94.0 | 93.2 |
| Comparison Example 2 | | | |
| Dispersion | 0.0 | — | — |
| RD powder | 0.0 | — | — |
| Example 2 | | | |
| RD powder | 27.8 | 87.2 | 93.7 |
| Example 3 | | | |
| RD powder | 5.2 | 91.3 | 53.6 |
| Example 4 | | | |
| RD powder | 1.9 | 88.7 | 89.5 |
| Example 5 | | | |
| Dispersion | 41.3 | — | — |
| RD powder | 44.1 | 79.5 | 85.7 |
| Example 6 | | | |
| RD powder | 8.4 | 90.2 | 89.7 |

What is claimed is:

1. A process for the preparation of crosslinkable dispersion powders which are redispersible in water and contain isocyanate groups, comprising copolymerizing by free-radical emulsion polymerization, one or more ethylenically unsaturated monomers in the presence of 0.2 to 6% by weight, based on the total weight of the monomers, of one or more ethylenically unsaturated isocyanates selected from the group consisting of meta- and para-isopropenyl-alpha, alpha-dimethylbenzylisocyanate and isocyanates of the general formula (I)

$$CH_2=CR^1-CO-O-R^2-CR^3R^4-N=C=O \qquad (I)$$

where $R^1$ is H or $CH_3$, and $R^2$ is an alkylene group having 1 to 18 C atoms, and $R^3$ and $R^4$ are identical or different alkyl groups having 1 to 4 C atoms; and drying the dispersions obtained by said copolymerization, wherein said emulsion polymerization and said drying are carried out in the presence of 5 to 70% by weight, based on the total weight of the monomers, of a protective colloid.

2. The process of claim 1 wherein said ethylenically unsaturated isocyanate comprises one or more of meta- or para-isopropenyl-alpha, alpha-dimethyl-benzylisocyanate or 2-methyl-2-isocyanatopropylmethacrylate.

3. The process of claim 1, characterized in that the isocyanates are copolymerized in an amount of 0.5 to 5% by weight, based on the total weight of the ethylenically unsaturated monomers.

4. The process of claim 2, characterized in that the isocyanates are copolymerized in an amount of 0.5 to 5% by weight, based on the total weight of the ethylenically unsaturated monomers.

5. The process of claim 1 wherein one or more monomers selected from the group consisting of vinyl esters of unbranched or branched alkylcarboxylic acids having 1 to 18 C atoms, methacrylic acid esters, acrylic acid esters of unbranched or branched alcohols having 1 to 18 C atoms, olefins, vinylaromatics, vinylhalogen compounds, and mixtures thereof are copolymerized as ethylenically unsaturated comonomers.

6. The process of claim 2 wherein one or more monomers selected from the group consisting of vinyl esters of unbranched or branched alkylcarboxylic acids having 1 to 18 C atoms, methacrylic acid esters, acrylic acid esters of unbranched or branched alcohols having 1 to 18 C atoms, olefins, vinylaromatics, vinylhalogen compounds, and mixtures thereof are copolymerized as ethylenically unsaturated comonomers.

7. The process of claim 3 wherein one or more monomers selected from the group consisting of vinyl esters of unbranched or branched alkylcarboxylic acids having 1 to 18 C atoms, methacrylic acid esters, acrylic acid esters of unbranched or branched alcohols having 1 to 18 C atoms, olefins, vinylaromatics, vinylhalogen compounds, and mixtures thereof are copolymerized as ethylenically unsaturated comonomers.

8. The process of claim 4 wherein one or more monomers selected from the group consisting of vinyl esters of unbranched or branched alkylcarboxylic acids having 1 to 18 C atoms, methacrylic acid esters, acrylic acid esters of unbranched or branched alcohols having 1 to 18 C atoms, olefins, vinylaromatics, vinylhalogen compounds and mixtures thereof are copolymerized as ethylenically unsaturated comonomers.

9. The process of claim 1 wherein one or more comonomers with reactive H atoms selected from the group consisting of hydroxyalkyl(meth)acrylates, ethylenically unsaturated carboxylic acids and amides thereof, half-esters of fumaric acid or maleic acid, and hydroxyalkyl esters of ethylenically unsaturated carboxylic acids and their monoesters with polyalkylene glycols having 2 to 10 recurring alkylene oxide units, are copolymerized in an equivalent ratio of active H atoms to NCO groups of 0.2 to 3.

10. The process of claim 2 wherein one or more comonomers with reactive H atoms selected from the group consisting of hydroxyalkyl(meth)acrylates, ethylenically unsaturated carboxylic acids and amides thereof, half-esters of fumaric acid or maleic acid, and hydroxyalkyl esters of ethylenically unsaturated carboxylic acids and their monoesters with polyalkylene glycols having 2 to 10 recurring alkylene oxide units, are copolymerized in an equivalent ratio of active H atoms to NCO groups of 0.2 to 3.

11. The process of claim 3 wherein comonomers with reactive H atoms selected from the group consisting of hydroxyalkyl(meth)acrylates, ethylenically unsaturated carboxylic acids and amides thereof, half-esters of fumaric acid or maleic acid, and hydroxyalkyl esters of ethylenically unsaturated carboxylic acids and their monoesters with polyalkylene glycols having 2 to 10 recurring alkylene oxide units, are copolymerized in an equivalent ratio of active H atoms to NCO groups of 0.2 to 3.

12. The process of claim 4 wherein comonomers with reactive H atoms selected from the group consisting of hydroxyalkyl(meth)acrylates, ethylenically unsaturated carboxylic acids and amides thereof, half-esters of fumaric acid or maleic acid, and hydroxyalkyl esters of ethylenically unsaturated carboxylic acids and their monoesters with polyalkylene glycols having 2 to 10 recurring alkylene oxide units, are copolymerized in an equivalent ratio of active H atoms to NCO groups of 0.2 to 3.

13. The process of claim 5 wherein comonomers with reactive H atoms selected from the group consisting of hydroxyalkyl(meth)acrylates, ethylenically unsaturated carboxylic acids and amides thereof, half-esters of fumaric acid or maleic acid, and hydroxyalkyl esters of ethylenically unsaturated carboxylic acids and their monoesters with polyalkylene glycols having 2 to 10 recurring alkylene oxide units, are copolymerized in an equivalent ratio of active H atoms to NCO groups of 0.2 to 3.

14. The process of claim 6 wherein comonomers with reactive H atoms selected from the group consisting of hydroxyalkyl(meth)acrylates, ethylenically unsaturated carboxylic acids and amides thereof, half-esters of fumaric acid or maleic acid, and hydroxyalkyl esters of ethylenically unsaturated carboxylic acids and their monoesters with polyalkylene glycols having 2 to 10 recurring alkylene oxide units, are copolymerized in an equivalent ratio of active H atoms to NCO groups of 0.2 to 3.

15. The process of claim 1 wherein the drying is carried out by means of spray drying.

16. A construction adhesive, comprising at least one dispersion powder made by the process of claim 1.

17. A binder for a coating composition or an adhesive, said binder comprising at least one dispersion powder made by the process of claim 1.

18. A binder for textile or paper, comprising at least one dispersion powder made by the process of claim 1.

19. A process for the preparation of crosslinkable dispersion powders which are redispersible in water and contain isocyanate groups, comprising copolymerizing one or more ethylenically unsaturated monomers by means of free-radical emulsion polymerization in the presence of 0.2 to 6% by weight, based on the total weight of the monomers, of one or more ethylenically unsaturated isocyanates selected from the group consisting of meta- and para-isopropenyl-alpha, alpha-dimethylbenzylisocyanate and isocyanates of the general formula (I)

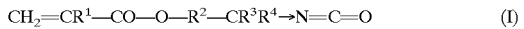

$$CH_2=CR^1-CO-O-R^2-CR^3R^4 \rightarrow N=C=O \qquad (I)$$

where $R^1$ is H or $CH_3$, $R^2$ is an alkylene group having 1 to 18 C atoms, and $R^3$ and $R^4$ are identical or different alkyl groups having 1 to 4 C atoms; and spray drying the dispersions obtained by said copolymerization, wherein said emulsion polymerization and said drying are carried out in the presence of 5 to 70% by weight, based on the total weight of the monomers, of a protective colloid.

20. The process of claim 19, wherein said ethylenically unsaturated monomers comprise an alkyl acrylate or comprise both an alkyl acrylate and styrene.

* * * * *

UNITED STATES PATENT AND TRADEMARK OFFICE
CERTIFICATE OF CORRECTION

PATENT NO. : 6,235,843 B1
DATED : May 22, 2001
INVENTOR(S) : Herbert Eck

It is certified that error appears in the above-identified patent and that said Letters Patent is hereby corrected as shown below:

Column 10,
Line 25, claim 19: delete "$CH_2 = CR^1\text{-}CO\text{-}O\text{-}R^2\text{-}CR^3R^4 \rightarrow N=C=O$" and insert
-- $CH_2 = CR^1\text{-}CO\text{-}O\text{-}R^2\text{-}CR^3R^4 \text{-} N=C=O$ --.

Signed and Sealed this

Sixteenth Day of October, 2001

Attest:

NICHOLAS P. GODICI
Attesting Officer    Acting Director of the United States Patent and Trademark Office